(12) United States Patent
Gratz et al.

(10) Patent No.: US 12,463,266 B2
(45) Date of Patent: Nov. 4, 2025

(54) GRAPHITE RECOVERY IN RECYCLED BATTERIES

(71) Applicant: Battery Resourcers LLC, Worcester, MA (US)

(72) Inventors: Eric Gratz, Worcester, MA (US); Zhangfeng Zheng, Worcester, MA (US)

(73) Assignee: Ascend Elements, Inc., Westborough, MA (US)

( * ) Notice: Subject to any disclaimer, the term of this patent is extended or adjusted under 35 U.S.C. 154(b) by 125 days.

(21) Appl. No.: 17/341,616

(22) Filed: Jun. 8, 2021

(65) Prior Publication Data
US 2021/0384563 A1    Dec. 9, 2021

Related U.S. Application Data

(60) Provisional application No. 63/036,066, filed on Jun. 8, 2020.

(51) Int. Cl.
*H01M 10/54* (2006.01)
*C22B 3/00* (2006.01)
(Continued)

(52) U.S. Cl.
CPC .............. *H01M 10/54* (2013.01); *C22B 7/007* (2013.01); *C22B 23/043* (2013.01);
(Continued)

(58) Field of Classification Search
CPC ... C22B 7/007; C22B 23/043; C22B 47/0063; C22B 23/0453; C22B 3/08; C22B 1/005;
(Continued)

(56) References Cited

U.S. PATENT DOCUMENTS

| 568,323 A | 9/1896 | Acheson |
| 1,380,458 A | 6/1921 | Woodruff et al. |

(Continued)

FOREIGN PATENT DOCUMENTS

| CN | 101619394 B | * 4/2011 |
| CN | 107464963 A | 12/2017 |

(Continued)

OTHER PUBLICATIONS

Ruismaki et al., "Integrating Flotation and Pyrometallurgy for Recovering Graphite and Valuable Metals from Battery Scrap," Metals 2020, 10, 680. (Year: 2020).*

(Continued)

*Primary Examiner* — Allison Bourke
*Assistant Examiner* — Bethany C Garcia
(74) *Attorney, Agent, or Firm* — Armis IP Law, LLC

(57) ABSTRACT

A method for recycling anode materials from a comingled recycling stream derived from exhausted Li ion batteries includes receiving a precipitate quantity remaining from a cathode recycling stream. This precipitate is almost exclusively graphite used for the anode material in the recycled batteries. The precipitate results from an acid leach of charge material from the lithium battery recycling stream. A strong acid is added to the precipitate for removal of residual cathode and separator materials and the mixture heated. The strong acid removes residual aluminum oxide from the separator by transformation to aluminum sulfate. Washing the acid treated precipitate removes water soluble contaminants, such as the aluminum sulfate reacted from the aluminum oxide and sulfuric acid, to generate substantially pure graphite. Any residual material remaining from the cathode recycling phase is also removed.

24 Claims, 3 Drawing Sheets

(51) Int. Cl.
  *C22B 7/00* (2006.01)
  *C22B 47/00* (2006.01)
  *H01M 4/133* (2010.01)
  *H01M 4/583* (2010.01)
  *H01M 10/0525* (2010.01)

(52) U.S. Cl.
  CPC ......... *C22B 47/0063* (2013.01); *H01M 4/133* (2013.01); *H01M 4/583* (2013.01); *H01M 10/0525* (2013.01)

(58) Field of Classification Search
  CPC ........... C22B 15/0071; C22B 23/0415; H01M 4/133; H01M 4/583; H01M 10/0525; H01M 10/54; H01M 6/52; H01M 4/131; H01M 4/505; H01M 4/525; H01M 4/587; H01M 2004/027; Y02P 10/20; Y02W 30/84; Y02W 30/52; C01B 32/20; C01B 32/215; C01B 32/2515; Y02E 60/10; B09B 3/00; B09B 2101/16; B09B 3/35; Y10S 423/02; B03B 2009/066; B03B 9/00; B03B 9/06; B03B 1/00; B07B 2220/04; B07B 2230/01; C01P 2006/80
  See application file for complete search history.

(56) References Cited

U.S. PATENT DOCUMENTS

| | | | |
|---|---|---|---|
| 2,787,528 | A | 4/1957 | Dorenfeld |
| 9,834,827 | B2 | 12/2017 | Wang et al. |
| 10,522,884 | B2 | 12/2019 | Wang et al. |
| 2006/0062716 | A1 | 3/2006 | Zaghib et al. |
| 2013/0302226 | A1 | 11/2013 | Wang et al. |
| 2020/0078796 | A1* | 3/2020 | Kochhar ............. C22B 23/0415 |
| 2022/0320619 | A1* | 10/2022 | Hanisch ................. C22B 7/007 |

FOREIGN PATENT DOCUMENTS

| | | | | |
|---|---|---|---|---|
| CN | 109678144 | A | | 4/2019 |
| CN | 110828926 | A | | 2/2020 |
| CN | 111072023 | A * | 4/2020 | ........... C01B 32/215 |
| CN | 111204757 | A | | 5/2020 |
| RU | 2479078 | C2 | | 4/2013 |
| WO | 2020112813 | A1 | | 6/2020 |

OTHER PUBLICATIONS

Wang et al., "Development of a Highly Efficient Hydrometallurgical Recycling Process for Automotive Li-Ion Batteries," Journal of Sustainable Metallurgy, 1, p. 168-178 (2015). (Year: 2015).*

Gao et al., "Graphite Recycling from the Spent Lithium-Ion Batteries by Sulfuric Acid Curing-Leaching Combined with High-Temperature Calcination," ACS Sustainable Chemistry & Engineering 2020 8 (25), 9447-9455. (Year: 2020).*

Mundszinger et al., "Morphology and texture of spheroidized natural and synthetic graphites," Carbon 111 (2017), p. 764-773. (Year: 2017).*

CN-111072023-A—English Translation (Year: 2020).*

International Search Report, PCT/US2021/036313, Sep. 23, 2021, pp. 1-7.

* cited by examiner

GRAPHITE RECOVERY IN RECYCLED BATTERIES

RELATED APPLICATIONS

This patent application claims the benefit under 35 U.S.C. § 119(e) of U.S. Provisional Patent App. No. 63/036,066, filed Jun. 8, 2020, entitled "ANODE RECOVERY IN RECYCLED BATTERIES," incorporated herein by reference in entirety.

BACKGROUND

Cathode material recovery is a primary focus of lithium ion (Li ion) batteries in widespread usage for automotive, personal electronics and industrial applications. A waste stream for recycled batteries, however, generally involves indiscriminate agitation (crushing and shredding) of full battery assemblies, resulting in comingled mixtures of cathode, anode, separator and casing materials. Recycling procedures directed towards cathode material recovery often result in a substantial volume of unused and/or discarded anode materials.

SUMMARY

A recycling process for anode materials recovers a secondary stream from acid leaching of cathode materials. Anode material recycling gathers solid particulate remains of acid leaching of the cathode materials from the comingled recycling stream of dismantled batteries rich in both cathode and anode materials. Charge material recycling of spent or exhausted batteries, such as that disclosed in U.S. Pat. No. 9,834,827 (incorporated herein by reference), tends to focus on cathode materials due to the economics of gathering new materials. Anode materials, however, such as graphite, also have value as recycled materials.

Configurations herein are based in part on the observation that modern trends towards production of electric vehicles (EVs) generate a substantial demand for secondary (rechargeable) batteries, along with a corresponding need to dispose or recycle these batteries at an end-of-service lifetime. Unfortunately, anode materials, comprised mainly of inexpensive graphite and/or carbon, have not been deemed feasible for large scale recycling, amid their cathode counterparts. Accordingly, configurations herein substantially overcome the shortcomings of anode recycling by receiving the anode materials in conjunction with a complementary cathode recycling process, and purifying the already refined graphite for use as recycled anode materials. Since the graphite has already undergone much of the processing and refining involved with producing battery-grade graphite, recycling from spent materials can be more efficient than refining new graphite.

A method for recycling anode materials from a comingled recycling stream derived from exhausted Li ion batteries includes receiving a precipitate quantity remaining from the cathode recycling stream via a membrane filter press, such that the precipitate has impurities substantially around 6-7% alumina and 4-5% weight of metal sulfates. The remainder of this precipitate is almost exclusively graphite used for the anode material in the recycled batteries. The precipitate results from an acid leach of charge material from the lithium battery recycling stream. A strong acid such as 98% $H_2SO_4$ is added to the precipitate for removal of residual cathode and separator materials and the mixture heated to around 300° C. Leaching of the cathode materials, usually nickel, manganese and cobalt, often leaves aluminum oxide, which had been utilized as a separator material between the cathode and anode sides of the battery. The strong acid removes aluminum oxide from the separator by transformation to aluminum sulfate. Washing the acid treated precipitate removes water soluble contaminants, such as the aluminum sulfate reacted from the aluminum oxide and sulfuric acid, to generate substantially pure graphite. Any residual NMC (Ni, Mg, Co) remaining from the cathode recycling phase is also removed.

Anode materials had received less attention for conventional recycling because the raw material (graphite) is less valuable than the cathode materials. Also, conventional anode processing employs hydrogen fluorine (HF) at extremely high temperatures, therefore substantial safety overhead is introduced. The approach proposed herein employs safer materials at a much lower temperature, allowing for cost effective anode recycling. Further, the raw anode materials for recycling may derive from a cathode recycling approach disclosed in the '827 patent disclosed above.

An additional feature includes qualitative separation and classification of graphite types. Battery manufacturers employ defined ratios of natural and synthetic graphite, and further distinguish different particle sizes, as the natural graphite takes on a "flake" structure. A composition ratio of natural to synthetic graphite resulting from the lithium battery recycling stream is identified, either by testing or identifying a known source composition from which the recycled batteries emerged from. The resulting pure graphite is sorted or denoted for preserving the composition ratio in the generated substantially pure graphite, typically around 60/40% synthetic to natural graphite, or alternatively 55/45%. The resulting harvested, purified graphite is around 98.5% pure, depending on several factors enumerated below.

The anode recycling approach, substantially directed to graphite recovery from the battery recycling stream, therefore benefits from the previous processing and purity of the graphite used in the first generation batteries. Anode materials from exhausted batteries have generally undergone impurity processing prior to use in first generation batteries. Any impurities in this anode material are limited to the surface of the graphite particles of the anode materials.

Identification of recycling streams from EV (electric vehicles) is further organized according to known vendors (vehicle manufacturers) and the chemical composition of Li ion batteries employed for respective manufacturers. Maintaining recycling streams sourced according to batteries from particular manufacturers provides a known composition of incoming anode materials. Preservation of a homogeneous stream allows this known composition to be carried through to the resulting pure graphite. In other words, incoming batteries from the same manufacturer, and having a 60/40% split with a certain size composition of the flake graphite, will recycle to a similar composition of pure graphite if the incoming stream is limited to the known vendor.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Electrochemical energy storage, typically implemented in the form of batteries, has become increasingly in demand with the advent of electric and hybrid vehicles. Configurations described below are beneficial for recycling of aging or exhausted charge materials in discarded batteries for recovering active charge materials with specific NMC molar ratios denoted as Ni:Mn:Co. Among the more common types of cathode materials are 60%:20%:20% (622), 80%: 10%:10% (811), 50%:30%:20% (532) and 33.3%:33.3%: 33.3% (111). A cathode charge material precursor is derived from sulfate forms of Ni, Mn and Co as defined in U.S. patents and applications including U.S. Pat. Nos. 9,834,827, 10,522,884, 10,741,890 and application Ser. No. 16/164,952.

While the elements of the cathode materials tend to be more lucrative for recycling, anode charge material, composed mainly of graphite and carbon, is also generated by the recovery. Subsequent processing allows recovery of this anode charge material as well. Leaching of the cathode materials such as nickel, manganese and cobalt, as well as chemical and physical removal of incidental components such as current collector metals and containment materials, results in a graphite/carbon residual with about 15% alumina and sulfate materials remaining. Subsequent treatment with a strong acid and moderate heating can be invoked to generate substantially pure graphite, as described further below.

Figure 1:
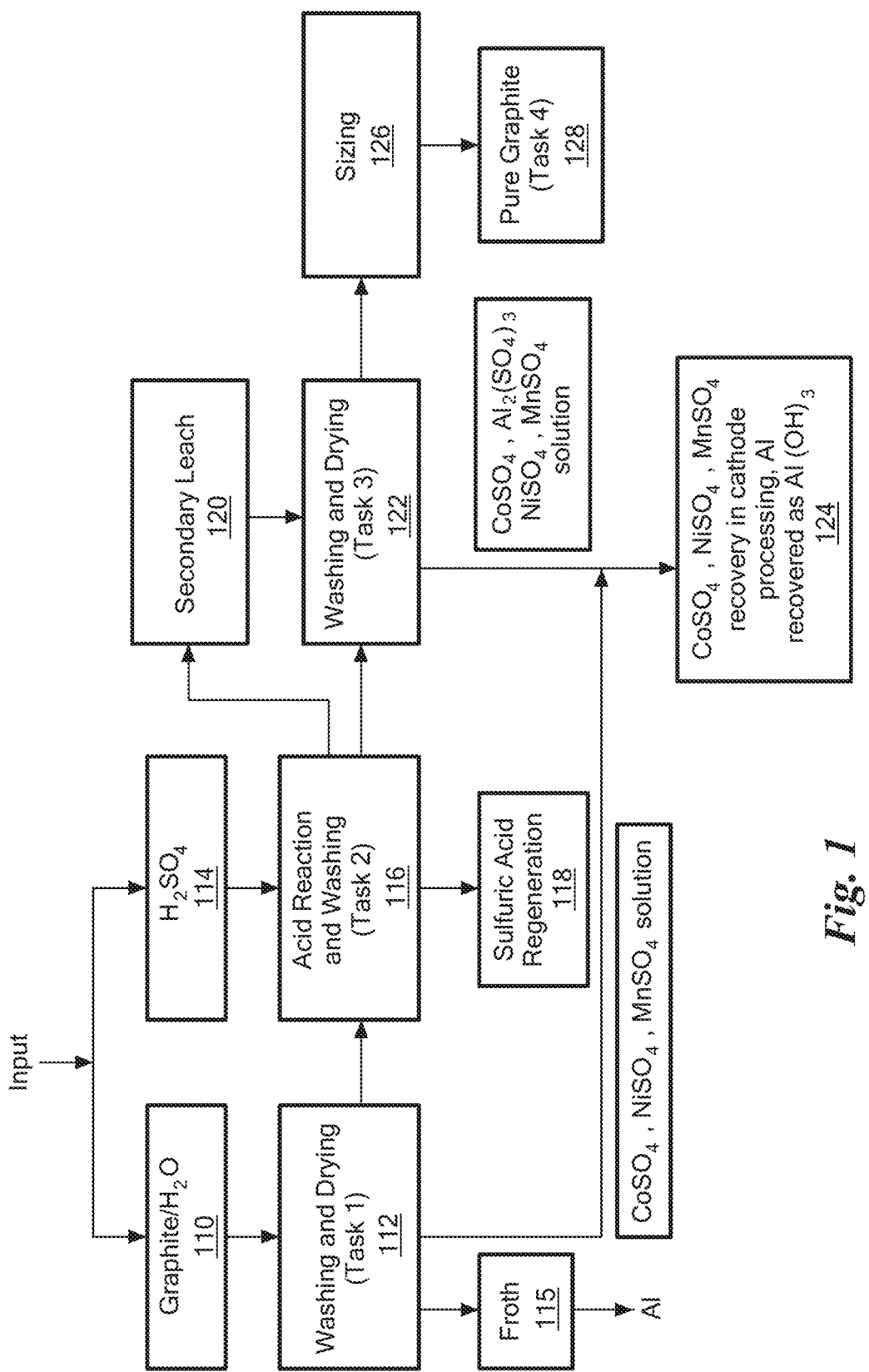
FIG. 1 is a flow diagram of the anode material recycling process disclosed herein.

FIG. 1 is a flow diagram of the anode material recycling process disclosed herein. Referring to FIG. 1, at step 110, a precipitate including graphite is received as a by-product or waste stream from a recycling operation for battery cathode materials. As outlined above, conventional approaches did not seek recovery of the anode materials (substantially graphite); in contrast, the approach herein recycles the graphite as a complementary process to the cathode recycling. Accordingly, the received precipitate is charge material remaining from a recycling stream of previously acid leached battery charge material for recycling. Any suitable recycling or other process may be employed for obtaining the graphite precipitate, however in a particular configuration this precipitate is obtained from previously leached charge material sourced from an NMC (nickel, manganese, cobalt) recycling stream, typically representing previously used charge material employed in charge cells from electric vehicles. One particular approach includes acid leaching according to the U.S. patent cited above. EVs have substantial sized batteries, and will continue to represent a recycling stream paralleling that of the vehicle lifespan. More specifically, these NMC batteries are Li-ion batteries (LIBs) and have been widely applied in millions of electric vehicles (EV) and plug-in electric vehicles.

Graphite for anode materials has a morphology, or shape characteristic, that defines a batch or quantity of bulk graphite. Generally, natural graphite has a flake characteristic and corresponding sizing, discussed further below in Table II. Synthetic graphite is more expensive, and generally has a powdery or particle texture. To produce anode material from natural flake graphite requires processing. Historically, this processing yielded one tons of anode grade graphite from every three tons of flake graphite concentrate. Even with modern production efficiencies, losses associated with graphite upgrading are in the range of 30-50% prior to final purification. Configurations herein depict recycling of lithium ion batteries from electric vehicles and recovering high purity graphite with morphology and blend (natural and synthetic) specifically designed for electric vehicle applications. Since the graphite has already been upgraded for battery use, recovery efficiency is on the order of 98%.

In conventional approaches, to bring the graphite to final anode material specifications the anode companies use treatment with hydrogen fluoride (HF) or inert high temperature baking to upgrade graphite from ~94% total graphitic carbon (Cg) to 99.95% Cg. The use of these expensive and environmentally taxing chemical and thermal treatment is required to remove impurities from deep in the material core. However, the impurities found in BR graphite are on the surface of the graphite, and are therefore easier to remove using cheaper, more environmentally friendly methods.

Since the graphite has been previously processed for use in batteries, it has already been refined and need not undergo much of the processing that first generation natural and synthetic graphite need endure for initial deployment. Further, since the approximate composition is known from the battery architecture, undesirable components can be identified by type and volume. Generally, the precipitate from the recycling stream has less than 11% impurities. More specifically, the precipitate typically has less than 7% alumina and less than 5% metal sulfates. These parameters are known from the battery architecture and the cathode recycling preceding and feeding the anode recycling.

The method for recycling anode materials from a comingled recycling stream of exhausted Li ion batteries includes, at step 112, washing the precipitate resulting from an acid leach of charge material from a lithium li ion battery recycling stream. This eliminates any water soluble components remaining from the NMC recycling/leach. An alternate approach involves separating the alumina via a frothing flotation step. based on the alumina having a lower density than the graphite, disclosed at step 115. Aluminum is often employed for current collectors in a typical manner, and therefore can be expected to be around 7% of the precipitate.

A strong acid such as sulfuric acid 114 is added to the precipitate for removal of residual cathode and separator materials, as depicted at step 116. This includes heating the mixture of the strong acid and residual cathode and separator materials to a temperature based on an expected purity of the resulting anode materials. Recall that the precipitate remains from a previous acid leach of the cathode materials, therefore it follows that the strong acid is stronger (has a lower pH) than the acid employed in the acid leach of the precipitate from the recycling stream. Sulfuric acid is particularly amendable to both cathode and anode leaching; in a particular example the strong acid is sulfuric acid at a concentration of least 98%. Generally, an increase in temperature and heating time increase the purity. Particular combinations leading to an expected purity are shown in Table I:

TABLE 1

| Purity | Time (hours) | Temp C° |
|---|---|---|
| 97% | 6 | 250 |
| 99.3% | 2 | 350 |
| 99.7% | 24 | 350 |

Other acids may be employed. For example, the strong acid may be formed by combining the sulfuric acid with one or more of another acid of based on an acidic strength of the combined acid. A particular arrangement includes forming the strong acid from a mixture of around 80% sulfuric and 20% nitric acid. Any suitable mineral acid or mineral acid mixture may be employed, however, for example Hydrochloric acid, Phosphoric acid, Boric acid, Hydrofluoric acid, Hydrobromic acid, Perchloric acid, and/or Hydroiodic acid for producing the purified anode material as discussed above.

Sulfuric acid regeneration may be performed to recover the sulfuric acid in an iterative form for successive recycling batches, shown at step 118.

An additional optional step includes, following the step of heating, performing a secondary leach for increasing a purity of the generated graphite, as depicted at step 120. The secondary leach may be performed with one of dilute hydrochloric acid or dilute sulfuric acid.

A further washing of the precipitate is performed for removal of water soluble contaminants to generate graphite of the expected purity, as shown at step 122, based on the information in Table 1 or alternate temperature and time parameters. This removes water soluble aluminum compounds.

A sizing of the now purified precipitate is performed in order to focus the materials for new, recycled batteries, as shown at step 126. Generally this includes identifying a composition ratio of natural to synthetic graphite resulting from the lithium battery recycling stream used for the precipitate, and preserving the composition ratio in the generated substantially pure anode materials. In other words, maintaining the morphology of the precipitate as known from the incoming recycling stream. Morphology of the graphite is detailed further in Table II:

TABLE II

| Source | Purity(% Cg) | Size | Mesh | Grade | $/ton |
|---|---|---|---|---|---|
| Natural | 85% | <149 um | (−)100 | Small Flake | $800 |
|  | 85% | >149 um | (+)100 | Medium Flake | $950 |
|  | 85% | >149 um | (+)80 | Large Flake | $1,100 |
|  | 85% | >297 um | (+)50 | Extra Large Fake | $2,200 |
|  | 99.95% | 10-15 um | (−)835 | Uncoated Spherical Graphite | $2800-$3,400 |
|  | 99.995% | 10-15 um | (−)835 | Coated Spherical Graphite | $4,000-$6,000 |
| Synthetic | 99.999% | 10-15 um | (−)835 | Synthetic Graphite | $8,000-$10,000 |
|  | 99.999% | 10-15 um | (−)835 | Coated Synthetic Graphite | $15,000-$20,000 |
| BR Blend | 99.95% | 10-15 um | (−)835 | Synthetic/Natural Bend | $2,000-$3,000 |
|  | 99.95% | 10-15 um | (−)835 | Coated Synthetic/Natural Blend | $3,200-$5,600 |

Synthetic graphite is the preferred material for lithium ion batteries due to its purity, performance, and consistency. As an anode material, synthetic graphite enables better cycling stability, faster charging, higher quality consistency, and fast production scalability. It can also be ascertained from the chart that synthetic graphite drives cost substantially. Accordingly, battery manufacturers define a formulation, often driven by the receiving automobile manufacturer, as to the battery composition. Identification of this composition (based on the morphology of the graphite in the battery), and preserving it through recycling ensures that it may be marketed back to a manufacturer specifying the particular composition.

High quality synthetic graphite is synthesized from needle coke. The global market for needle coke is highly fragmented, being dominated by several large producers, but constrained due to technical requirements on the crude oil from which the needle coke is a refining by-product. Growing demand for needle coke in the steel and Li-ion battery industries along with tightening environmental regulations look to create strong pricing headwinds.

Natural graphite, while being sourced from mines across the world, comes in a wide array of purities and flake sizes. To convert natural graphite into the size selected, ultra-pure, spheronized material demanded by battery applications requires stringent selection of starting material to ensure long-term consistency and stability. While graphite is a fairly ubiquitous mineral across the earth, not all mines produce the consistent, large flake material required as a starting point to economically generate the desired product specifications. Accordingly, it is usually preferred to generate the substantially pure graphite to have a morphology based on the identified morphology of the natural graphite. The resulting product is substantially pure graphite, as depicted at step 128.

Figure 2A:
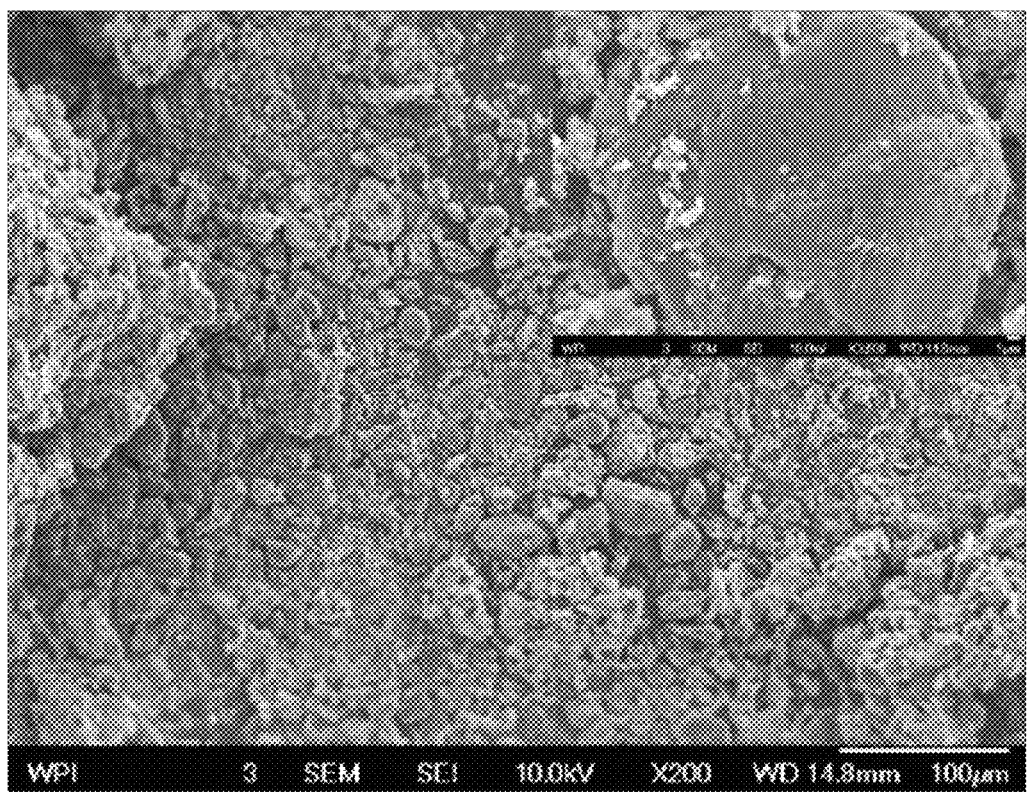
FIGS. 2A-2B are SEM (Scanning Electron Microscope) graphs of the recycled charge material from the flow of FIG. 1.
Figure 2B:
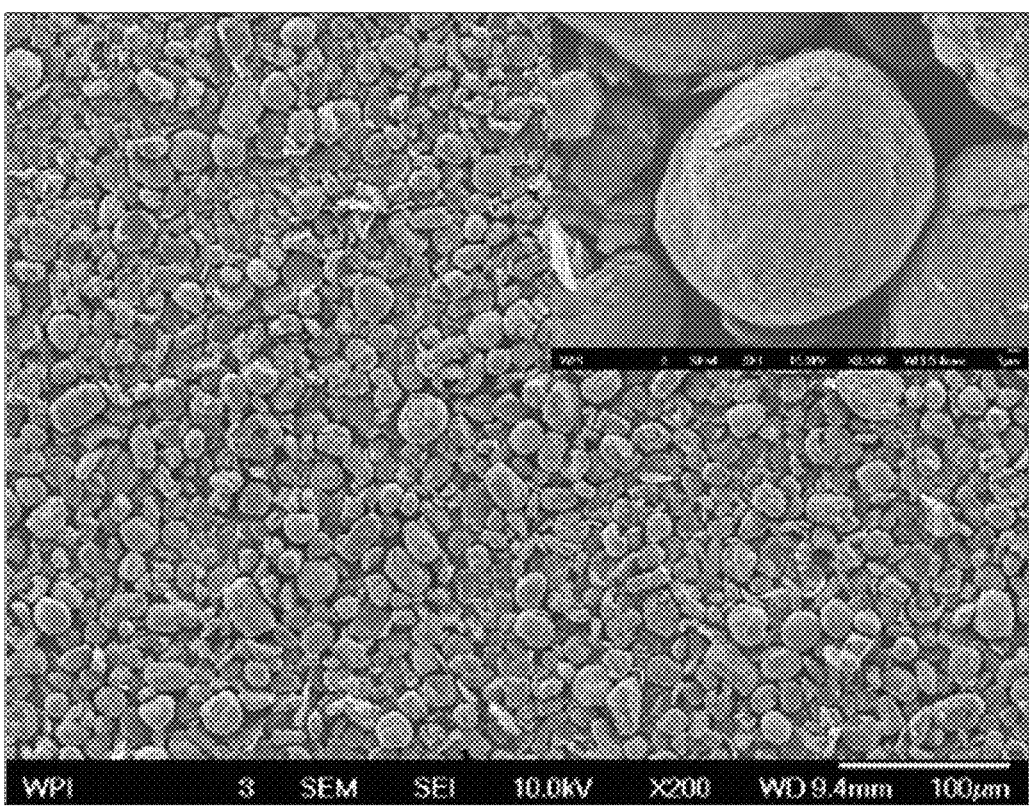

FIGS. 2A-2B are SEM (Scanning Electron Microscope) graphs of the recycled charge material from the flow of FIG. 1. Referring to FIGS. 2A and 2B, an impact of the purification process is also illustrated by SEM. FIG. 2A shows SEM images of original graphite from spent lithium ion batteries, and FIG. 2B shows purified graphite based on the process of FIG. 1. As shown in FIG. 2A, serious agglomeration phenomenon and much residue are observed in the graphite. However, after purifying process, agglomeration phenomenon and residue decrease and even disappear in FIG. 2B, as FIG. 2B exhibits a more well refined, single particle quality in the graphite. This indicates the effective removal of impurities with the recycling process. The graphite particles do not have significant morphology change, which means the morphology of graphite is not destroyed in the purification process. In addition, the surface of recycled graphite is smoother and clearer compared with original graphite, indicating the significant decreasing of the impurities.

Figure 3:
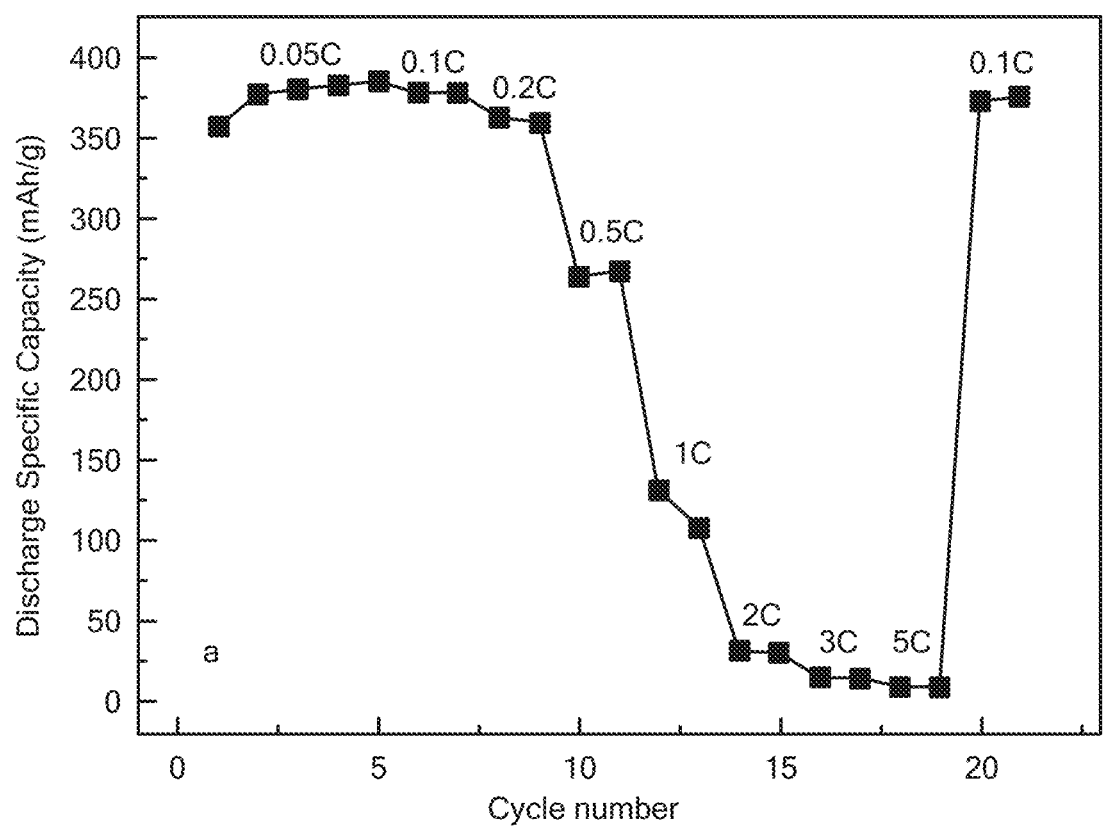
FIG. 3 is a graph of charging characteristics using the charge material of FIG. 1.

FIG. 3 is a graph of charging characteristics using the charge material of FIG. 1. FIG. 3 shows the rate performance of recovered graphite anode. The discharge capacity of recycled graphite is 377.3 mAh/g at 0.1 C, which is very comparable to the commercial graphite.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for recycling graphite from a recycling stream of exhausted Li-ion batteries, consisting of:
   receiving a comingled Li-ion battery recycling stream of dismantled Li-ion batteries including both cathode and anode materials;
   leaching of cathode charge materials from the comingled Li-ion battery recycling stream with an aqueous acid leach; and
   generating a precipitate comprising graphite and impurities comprising alumina and metal sulfates from the aqueous acid leach;
   wherein, after the aqueous acid leach of the cathode charge materials, a mixture is formed by adding a strong acid to the generated precipitate for removal of the impurities, the strong acid resulting in a pH lower than a pH of the precipitate-generating acid leach;
   heating the mixture at a temperature between 250° C. and 350° C.; and
   washing the generated precipitate for removal of water soluble contaminants to generate purified graphite.

2. The method of claim 1 wherein the precipitate has less than 11 wt % impurities.

3. The method of claim 1 wherein the purified graphite has less than 7 wt % alumina and less than 5 wt % metal sulfates.

4. The method of claim 3 further comprising separating the alumina based on the alumina having a lower density than the graphite via a frothing flotation step.

5. The method of claim 1 wherein the Li-ion battery recycling stream is generated from charge material remaining from a recycling stream of previously acid leached battery charge material for recycling.

6. The method of claim 5 wherein the Li-ion battery recycling stream results from a previous leach of cathode charge material sourced from an NMC (nickel, manganese, cobalt) recycling stream.

7. The method of claim 1 further comprising receiving the Li-ion battery recycling stream by recovery from a waste stream of previously used charge material employed in charge cells from electric vehicles.

8. The method of claim 1 wherein the strong acid is sulfuric acid at a concentration of least 98 wt %.

9. The method of claim 1 further comprising:
   identifying a composition ratio of natural graphite to synthetic graphite resulting from the Li-ion battery recycling stream; and
   maintaining the identified composition ratio in the generated purified graphite.

10. The method of claim 9 further comprising identifying a morphology of the natural graphite, and
    generating the graphite to have a morphology based on the identified morphology of the natural graphite.

11. The method of claim 1 further comprising, following the step of heating, performing a secondary leach for increasing a purity of the generated graphite.

12. The method of claim 11 wherein the secondary leach is performed with one of dilute hydrochloric acid or dilute sulfuric acid.

13. The method of claim 1 further comprising generating the strong acid by combining sulfuric acid with one or more of another acid.

14. The method of claim 1 further comprising forming the strong acid from a mixture of around 80 wt % sulfuric and 20 wt % nitric acid.

15. The method of claim 1 wherein the strong acid is a mineral acid or mineral acid mixture including acids selected from the group consisting of sulfuric acid, nitric acid, hydrochloric acid, phosphoric acid, boric acid, hydrofluoric acid, hydrobromic acid, perchloric acid, and hydroiodic acid.

16. The method of claim 1 wherein the mixture is heated at a temperature of at least 250° C. for 6 hours achieving a purity of at least 97.0%.

17. The method of claim 1 wherein the mixture is heated at a temperature of 350° C. for 2 hours achieving a purity of at least 99.3%.

18. The method of claim 1 wherein the mixture is heated at a temperature of 350° C. for 24 hours achieving a purity of at least 99.7%.

19. A method for recycling graphite from a recycling stream of exhausted Li-ion batteries, consisting of:
    receiving a comingled Li-ion battery recycling stream of dismantled Li-ion batteries including both cathode and anode materials;
    leaching of cathode charge materials from the comingled Li-ion battery recycling stream with an aqueous acid leach; and
    generating a precipitate comprising graphite and impurities comprising alumina and metal sulfates from the aqueous acid leach;
    wherein, after the aqueous acid leach of the cathode charge materials, a mixture is formed by adding a combination of 80 wt % sulfuric acid and 20 wt % nitric acid to the generated precipitate resulting in a pH lower than a pH of the precipitate-generating acid leach for removal of the impurities to yield recycled graphite;
    heating the mixture to a temperature between 250° C. and 350° C. for at least 6 hours; and
    washing the generated precipitate for removal of water soluble contaminants to generate a purity of at least 96% in the recycled graphite.

20. The method of claim 1 wherein the mixture is heated at a temperature of at least 300° C. for 24 hours achieving a purity of at least 99.5% in the recycled graphite.

21. A method for recycling graphite from a recycling stream from exhausted Li-ion batteries, consisting of:
    receiving a comingled Li-ion battery recycling stream of dismantled Li-ion batteries including both cathode and anode materials;
    leaching of cathode charge materials from the comingled Li-ion battery recycling stream with an aqueous acid leach; and
    generating a precipitate comprising graphite and impurities comprising alumina and metal sulfates from the aqueous acid leach;
    wherein, after the aqueous acid leach of the cathode charge materials, a mixture is formed by adding a strong acid to the precipitate for removal of the impurities, the strong acid composed of 80 wt % sulfuric acid and 20 wt % nitric acid and resulting in a pH lower than a pH of the precipitate-generating acid leach;
    heating the mixture at a temperature between 250° C. and 350° C.; and
    washing the generated precipitate for removal of water soluble contaminants to generate purified graphite suitable for use as anode material in a recycled battery.

22. The method of claim 1, wherein the precipitate includes at least anode materials remaining after the aqueous acid leach of cathode materials including Ni, Mn and Co charge materials.

23. The method od claim 1 further comprising maintaining temperature at or below 350° C. for hydrometallurgical recycling.

24. The method of claim 1 wherein the generated precipitate results from an acid leach of a granular Ni, Mn, Co recycling stream, the recycling stream including the cathode and anode materials and the acid leach leaches Ni, Co and Mn sulfates from the granular Ni, Mn, Co recycling stream.

* * * * *